United States Patent [19]

Allen et al.

[11] 4,214,419

[45] Jul. 29, 1980

[54] COLLATING AND SHRINK WRAP PACKAGING APPARATUS

[75] Inventors: Fred E. Allen, Vineland; Bruce W. Thuener; Ronald F. Turpin, both of Millville, all of N.J.

[73] Assignee: Wheaton Industries, Millville, N.J.

[21] Appl. No.: 947,394

[22] Filed: Oct. 2, 1978

[51] Int. Cl.² .............................................. B65B 35/40
[52] U.S. Cl. ........................................ 53/543; 53/553; 53/389
[58] Field of Search ................. 53/543, 553, 555, 557, 53/389

[56] References Cited

U.S. PATENT DOCUMENTS

| | | | |
|---|---|---|---|
| 3,191,356 | 6/1965 | Zelnick et al. | 53/555 |
| 3,481,107 | 12/1969 | Andblad et al. | 53/543 |
| 3,590,552 | 7/1971 | Marschke | 53/389 X |
| 4,041,677 | 8/1977 | Reid | 53/543 |

Primary Examiner—Travis S. McGehee
Attorney, Agent, or Firm—Miller & Prestia

[57] ABSTRACT

In a packaging apparatus, articles are collated and formed into a module on a carriage assembly and are transported into a draped wrapping film and to means for sealing the wrapped module. Common movement of the sides of the carriage assembly are provided so as to ensure the stability of the collated article pattern. The draped wrapping film is under tension and is aligned with respect to the direction of travel of the carriage assembly. Side and transverse rear sealing of the wrapped module is provided, and the means for rear sealing the module also cuts the wrapping film and splices the unused wrapping film for return to its draped position. The wrapped and sealed module is transferred by a conveyor means from its wrapping position to a means for shrinking the wrapping film over the article module.

30 Claims, 5 Drawing Figures

COLLATING AND SHRINK WRAP PACKAGING APPARATUS

The present invention relates to an apparatus for continuously collating and shrink wrap packaging successively presented pluralities of articles and more specifically relates to such apparatus with greatly improved efficiency as compared to prior art methods and apparatus, particularly in handling small articles, such as pharmaceutical and cosmetic containers.

BACKGROUND OF THE INVENTION

Small containers are conventionally packaged into a shrink wrapped module by first placing a pre-cut sheet of shrinkable film (such as cross-linked polyethylene) into a cardboard tray then placing individual containers by hand into the tray in a prescribed pattern. The film is then manually draped over the top of the formed module and the module is transported, often with one or more intervening storage-handling steps, to a sealing operation in which an impulse heated wire device called an "L-Sealer" presses the top and bottom films together and seals them on two open sides of the module. The module is then turned around and the remaining open edge is similarly sealed.

The sealed package is then transferred through still another operation to an oven or heat tunnel to shrink the wrapping in two stages, the first stage shrinking the top of the wrapping and the second stage, after the package is withdrawn, inverted and the cardboard carton removed, shrinking the bottom of the wrapping.

In some operations, the collating of such containers into a shrink wrapable module has been mechanized by mass infeed conveyors delivering the articles to be packaged into a collection space defined by guide rails and stops, of predetermined size and configuration which, together in some cases with manual assist, results in the collection of the articles in a collated predetermined pattern.

In one such mechanized operation, the rear end of the package is formed by a reversible conveyor which removes articles collected in the predetermined pattern backwardly at a side or end of the collated article package to be wrapped. When the collated article module is then subsequently wrapped, the reversible conveyor is re-reversed and those collated articles at the front end form the front end of the subsequently formed package.

The transfer of such mechanized collated article collections into a shrinkable wrapped package has also been mechanized to some extent. In one such process, a vacuum lift mechanism raises the collated articles and then lowers them into a cardboard carton in which a pre-cut shrinkable film has been laid. When the articles are lowered into the carton a part of the shrinkable wrapping is laid over the top of the package and then transferred for subsequent sealing and shrinking, as in prior manual operations.

In another process, this has been accomplished by the collection of the collated articles on a platform capable, in conjunction with a hand held inverted tray, of capturing the collated articles on the top side, and inverting the collected articles. In this manner, the collated articles may be covered with a shrink wrapable film, which may in turn be covered by an inverted cardboard carton tray and the assembly in sandwiched style inverted so as thus to deposit the collated articles into a cardboard carton tray with a shrinkable film on the bottom side thereof between the collected articles and tray. The shrinkable film is then wrapped over the top of the inverted collected articles and transferred to other operations for sealing and shrinking.

In subsequently developed "automatic" collating and shrink wrapping machines, particularly referring to the "PLM" machine manufactured by Hirsch of Germany and the "Errani" and "Micron Errani" machines from Italy, groups of articles or bottles are automatically collated by pushing together successively formed rows of articles. Push members then propel the collated and collected group of articles or bottles through static guide rails (actually converging rails at one point in the "PLM" machine) and over dead plates. In the course of travel, the collated group of articles in each of these machines encounters an interposed, vertically draped sheet of shrinkable film, such as low density polyethylene, thereby wrapping the film about the front, bottom and top of the collated group of articles. An open-sided sleeve is then formed upon sealing the overwrapped film from top to bottom at the rear of the collated group of articles. In all of the known PLM, Errani and Micron Errani machines, this sleeve-wrapped grouping is then pushed over another dead plate onto a conveyor to still another sealing area at which the sides of the sleeve are sealed, either by resistive heat-sealing bars mating the top and bottom films at the sides of the package or by folding the top and bottom of the package on itself and continuing the package into the shrink wrapping position. In either case, the wrapped collated, collection of articles then is conveyed over still another dead plate into the heating space in which the wrapped film is shrunk.

In these prior art "automatic" machines, the collating mechanisms require intermittent sliding of groups of bottles, closure of guide rails over the collated package, and in general the movement of the collated package through static side rails or over dead plates, all to the detriment of the overall stability of individual articles, particularly in collected packages of small articles or containers.

Moreover, the rear and side sealing means in these machines require multiple stations and multiple transfers of the collated package while insufficiently retained in the collective grouping and over dead plates while insufficiently retained and into still another separate unit for the eventual shrinking of the shrinkable film.

Still further, in the "automatic" shrink wrapping machines available to date, the film supply and threading mechanisms and the tensioning means for the draped continuously supplied film are awkward and accessible only with some difficulty.

These and other similar factors having to do with the maintenance and set up of the machines result in inherent inefficiencies, complexities, bulk and expense in the manufacture and operation of prior art machines.

Keeping these problems in mind, it is a general objective of the present invention to provide a semi-automatic collating and shrink wrap packaging machine which is sufficiently small and simple to operate that it may be transported from line to line within a plant and operated by no more than one person. Moreover, it is within the general objective of the present invention to provide such a machine which is optimized with respect to movement of articles once collated so as to retain the collated group in a stable fixed pattern with minimum opportunity for upset of individual articles or disturbance of the pattern within the collated collection.

Still further, it is an object of this invention to provide such apparatus and specific subassemblies thereof in which the wrapped collated article grouping is effectively sealed and the wrapping shrunk in an essentially integral single unit with cycle time minimized and interposition transfer mechanisms adapted to maintain the collated articles in their prearranged position until the final shrink wrapping is effected.

Another object is to provide convenient film supply, tensioning, rear sealing and cutting mechanisms in such apparatus.

Still another object of this invention is to provide such an apparatus which is conveniently adapted to handle different sized articles or containers and which, notwithstanding its general simplicity and ease of maintenance and operation, is especially adapted, with efficiency and reliability, to collate and shrink wrap in a sealed package small articles or containers which are generally unstable and difficult to maintain in a prearranged collated pattern.

These objects, and others which will become apparent in the course of the subsequent description of this invention, are all met by the invention, the description of which follows:

BRIEF SUMMARY OF THE INVENTION

In general, this invention comprises a semi-automatic machine, and sub-assemblies thereof, for collating and shrink-wrapping articles, particularly containers or bottles and most particularly small articles or containers which are difficult to maintain in a stabilized prearranged pattern. In this machine, the collated plurality of articles, while stabilized on three sides by pusher and movable side rails is slid through a vertically draped sheet of continuously fed shrinkable wrapping, and onto a conveyor, thereby to envelop the collated plurality of articles on top, bottom and front. This encasement is then formed into a sleeve by sealing and cutting means which joins the top and bottom wrapping at the rear end of the package and at the same time splices the top and bottom of the shrinkable wrapping material in preparation to receive a subsequently presented plurality of collated articles. Thereafter, the sleeve encased plurality of articles is sealed at its sides by heating members in combination with bottom presented anvils and the thus sealed plurality of collated articles is conveyed still on the same conveyor belt directly into a shrinking chamber, preferably an integral heated tunnel. In the course of passage of the sealed and wrapped plurality of collated articles through the heated tunnel, the heat shrinkable film shrinks and wraps tightly about the plurality of collated articles thus forming a unitized package for ease of subsequent handling and storage.

Important and novel features of this over-all design include the movable side rails to maintain stability of the collated grouping of bottles through transfer onto a conveyor and the use of that conveyor thereafter to transport the collated grouping until it is finally stabilized in the shrink wrapped package.

In the preferred form of the present invention, the collated group of articles is formed by conveying the articles into an assembly including laterally adjustable, movable side rails and a front product stop consisting of a patterned stop member. The initial front pattern of articles may be manually assisted into proper arrangement for the first row. A reversible mass in-feed conveyor determines the rear cut-off point for the predetermined pattern of collated articles to be collected. Those collated articles collected at the rear thereof are temporarily removed at the cut-off position by reversing the in-feed conveyor. Subsequently, as the in-feed is re-reversed these front-most articles are delivered, already collated to form the front of a subsequent grouping, the first row of which is determined by the pattern cut-off point of the reversible in-feed conveyor. The adjustable side rails together with a pusher member, preferably an opposing face of the front stop member which is pivotally mounted in the assembly to swing upwardly over and to the rear of the collated grouping, serve as a movable unit to slidingly transport the collated plurality of articles thus collected, while stabilized on three sides, through a vertically draped sheet of shrinkable film onto a conveyor, at a position which constitutes the rear sealing position for the collated articles.

The rear sealing means, the film supply and tensioning means, the aligned, self-centering laterally adjustable side-sealing means (all to be described fully hereafter), as well as the collating and transfer, movable side-rail sub-assembly (described above and to be more fully described below), are all important and novel features of the present invention.

For a better description of this invention, reference may be made to the following detailed description thereof, taken in conjunction with the appended claims and accompanying drawings.

DETAILED DESCRIPTION OF THE INVENTION

Figure 1:
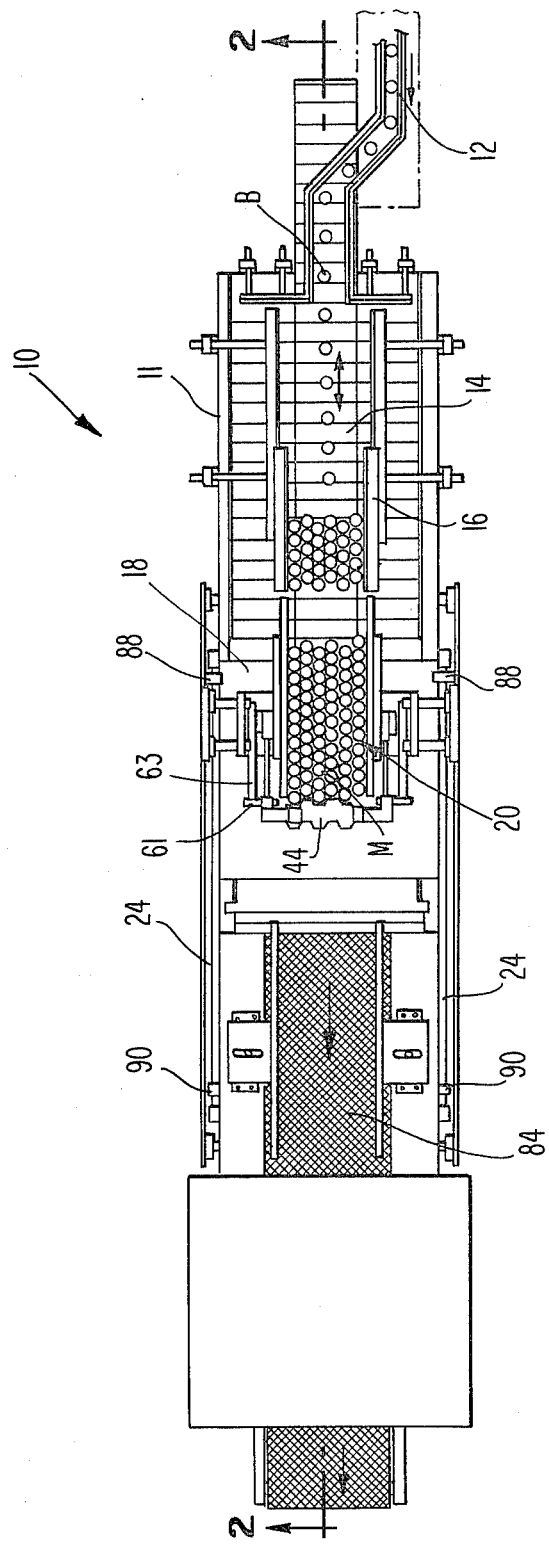
FIG. 1 is a top plan view of the article collating and shrink wrap packaging apparatus of the present invention.

Referring to the Figures, there is shown the preferred embodiment of the article collating and shrink wrap packaging apparatus of the present invention. This apparatus, though not limited thereto, is designed to handle relatively small and somewhat unstable (with respect to their tendency to tip and move relative to one another) articles, namely cylindrical bottles, $\frac{1}{2}$ to 3 inches in diameter and 1 to 5 inches in height.

More specifically, this apparatus comprises an integrated machine 10 mounted on a common frame 11 with extended static mounts 13. Static mounts 13 may be retracted, to allow machine 10, with frame 11, to rest on castors 15, for easy transportability of machine 10.

Bottles B are fed onto container collating and shrink wrap packaging machine 10 by a single line conveyor 12 (not part of machine 10), typically a conveyor by which bottles B exit a bottle making machine or inspection station. Single line conveyor 12 communicates with a reversible mass in-feed conveyor 14, including a pair of spaced-apart, adjustable rails 16 which determine the maximum width of the collection of bottles grouped on mass in-feed conveyor 14.

Figure 3:
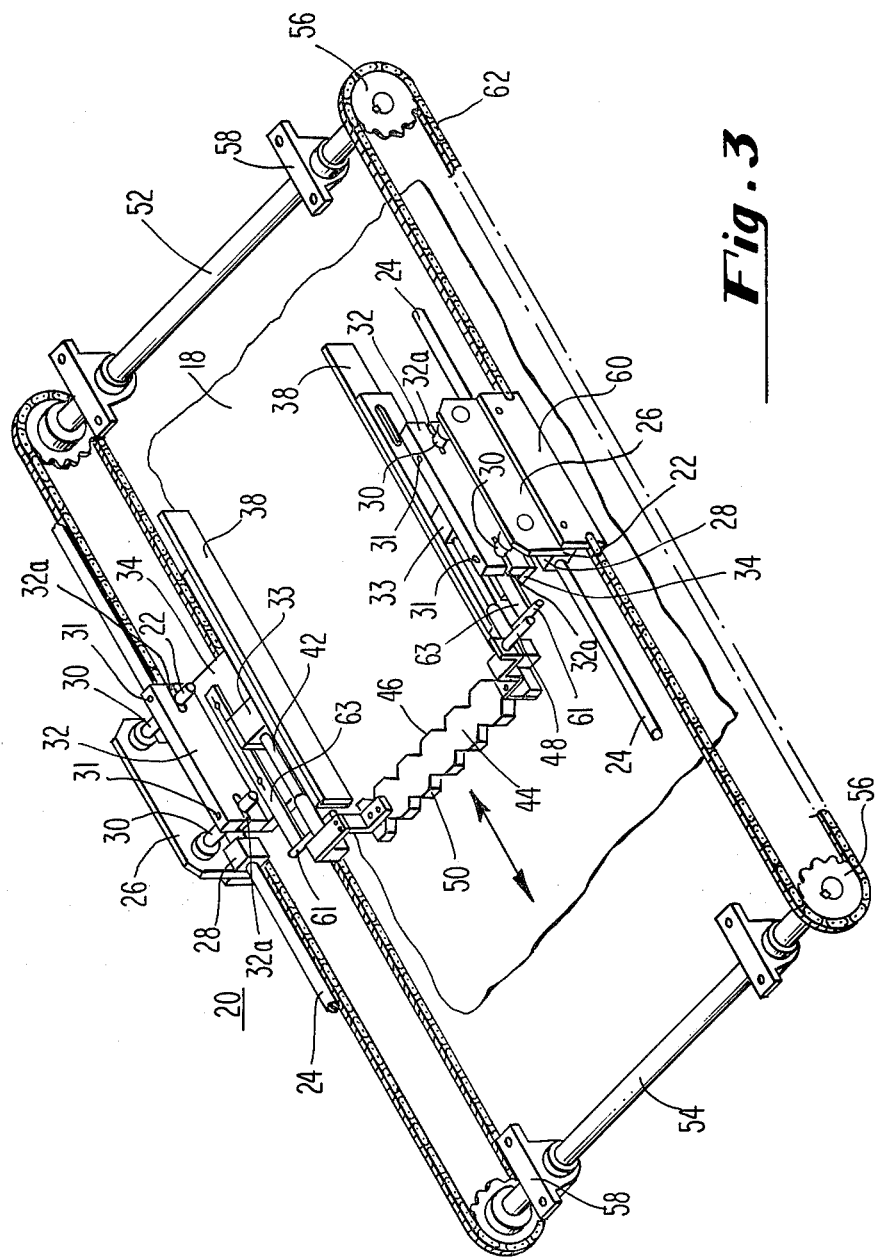
FIG. 3 is a perspective view showing the common drive means and the carriage assembly portion of the present invention.

Mass in-feed conveyor 14 delivers bottles B to collating position base plate 18 over which is suspended carriage assembly 20 for collection of bottles B into a side-to-side group M of predetermined pattern suitable for subsequent wrapping. Referring specifically to FIGS. 1 and 3, carriage assembly 20 includes two spaced-apart carriage brackets 22 which are slidable along a pair of spaced-apart and parallel carriage guide rails 24. Each carriage bracket 22 comprises a plate 26 with one or more bushing blocks 28 attached thereto (each having linear bushings, through which extend carriage guide rail 24, to facilitate travel of carriage bracket 22 along guide rail 24), and a sprocket guide chain engaging skirt 60. A pair or rods 30 extends from each carriage bracket 22 to a second plate 32. Each second bracket 32 is part of a substantially "U" shaped assembly, formed by said second plate 32, in combination with a flat plate 34, substantially parallel to base plate 18 and a container guide rail 38, which is generally elongated and rectangular in shape with its wider inner surface adapted to contact the side of bottles B in collated group M, thereby to maintain good container stability within the group M. Container guide rails 38 are spaced apart and the space therebetween, which also corresponds to that between rails 16 associated with in-feed conveyor 14, determines the width of bottle group M. Like rails 16, container guide rails 38 are adjustable in their lateral spacing, the adjustment of rails 38 being made by movement of plates 34 along the lengths of shafts 30. Rails 38 are retained at any adjustment position by clamping screws 31.

Pivotably mounted to carriage assembly 20 are swing arms 42, between the outer ends of which is extended stop member 44, typically composed of wood or other suitable material. Pivotal mounts 33, associated with brackets 32, are adapted to permit arms 42 and stop 44 to be pivoted about a common horizontal axis extending between brackets 32.

Stop member 44 includes a facing surface 46 having a notched pattern determinative of the spacing of bottles B in the front or first row of group M. As shown in FIGS. 1 and 3, facing surface 46, in this embodiment of the invention, is of a saw-tooth pattern, the spacing of the grooves of which corresponds to the diameter of bottles B. This results in the forming of a repetitive staggered pattern of bottles B as shown in FIG. 1. The stop member 44 is itself rotatable, relative to swing arms 42, so that when the operator grasping handle 48 pivots swing arms 42 and stop member 44 upwardly and over bottle group M, stop member 44 rotates and comes to rest at the rear of bottle group M with push surface 50 facing bottle group M. Push surface 50 is also patterned to conform to the pattern of bottles B in bottle group M at the rear-most row thereof. This relationship and the specific pattern of grooves in facing surface 46 and relative to guide rails 38 are substantially determinative of the pattern of bottles collected in group M.

In alternative embodiments of this invention, the pattern of receiving surface 46 and pushing surface 50 may be adapted to a wide range of articles and article spacing and the pattern may comprise elliptical, as well as half-round or quarter-round grooves or may be substantially flat, depending on the size, configuration and intended spacing of articles to be received and collated.

While it is sometimes necessary for the operator to assist the formation of the first row of articles or bottles at the receiving surface 46 so as to establish the beginning of the predetermined pattern in the collated group M, thereafter the bottles or articles themselves tend to collect in a repetitive row by row pattern, with the rows either staggered or on line with one another.

The length of group M, or number of rows of articles or bottles in the collected group M, is generally determined by the rearward limiting member 88 which stops the rearward movement of carriage assembly 20 on carriage guide rails 24. The length of collected group M (and the resultant wrapped module produced by the machine) is then defined by the distance between the facing surface 46 of member 44 and the end of plate 18, the rear-most portion of bottles or articles in collected group M being determined upon periodic reversal of mass in-feed conveyor 14, leaving a rear-most row of bottles or articles in collected group M, still in a predetermined pattern and a forward-most row of bottles in a partially or fully collected group on mass in-feed conveyor 14, ready for forward delivery upon re-reversal of mass in-feed conveyor 14 so as to establish the next subsequently formed group of bottles M in a succeeding cycle.

With respect to the reversible in-feed conveyor, forward receiving surface and guide rails and the overall mechanism and operation by which articles or bottles are collected and collated in this embodiment of the invention, such collection and collating mechanisms and methods (though not laterally adjustable in the same manner and not adapted for sliding transfer of the collated bottles) have previously been utilized in other semi-automatic shrink wrapping apparatus previously devised and now in commercial operation for well over a year, for the assignee of this invention by the present inventors, with some cooperative effort by individuals not joined herein.

Slots 32a are provided in brackets 22 to permit longitudinal adjustment of brackets 22, and members associated therein, relative to shafts 30. In this manner, the collating carriage may be adapted to module packages of different length.

As best seen in FIG. 3, carriage assembly 20 further includes means for providing common movement of spaced-apart carriage brackets 22 and container guide rails 38. This means for common movement is important since it assures the synchronous movement of both container guide rails 38, thereby preventing disturbance of the bottle group pattern, i.e., misalignment of bottles during group transfer. The common movement means includes first and second shafts 52 and 54 which are substantially parallel to each other and which are attached to the underside of frame 11 by pillow block bearings 58.

Extending from the lower portion of the plate 26, skirt 60 engages a drive chain 62 attached at each side thereof. Drive chains 62 are adapted to mate with sprocket wheels 56 on shafts 52 and 54. Thus, as a result of the cooperation between first and second drive shafts 52 and 54 and drive chains 62 common movement of carriage assembly 20 and specifically container guide rails 38 and push member 44, is provided.

This assembly may be reciprocably driven by a piston or motor, operatively connected with the lower lengths of sprocket chains 62, to effect intermittent movement of the assembly between stops 88 and forward stops 90 (shown in FIG. 1) on carriage guide rails 24. (Forward stops 90, like rear stops 88, are adjustable along the length of carriage guide rails 24, dependent on the intended length of collated bottle group M, so that at the forward travel limit, the wrapping film can be brought together and sealed just to the rear end of bottle group M.) Preferably, however, the sliding transfer motion is manually driven by an operator, grasping and pulling handle 48 longitudinally, who first unlatches the transfer interlock at stops 88 (interlocked to prevent such release until the previous package has exited the shrink tunnel 86 (described more fully below).

Extending forwardly from brackets 22 of carriage assembly 20 are film pushing members 61 attached by connecting members 63 to the top of plate 34 of brackets 22 and adapted to lead a collated group of articles during sliding transfer by assembly 20. Members 61 first contact a vertically draped shrinkable film so that it wraps evenly and wrinkle-free about the collated group of articles.

Figure 2:
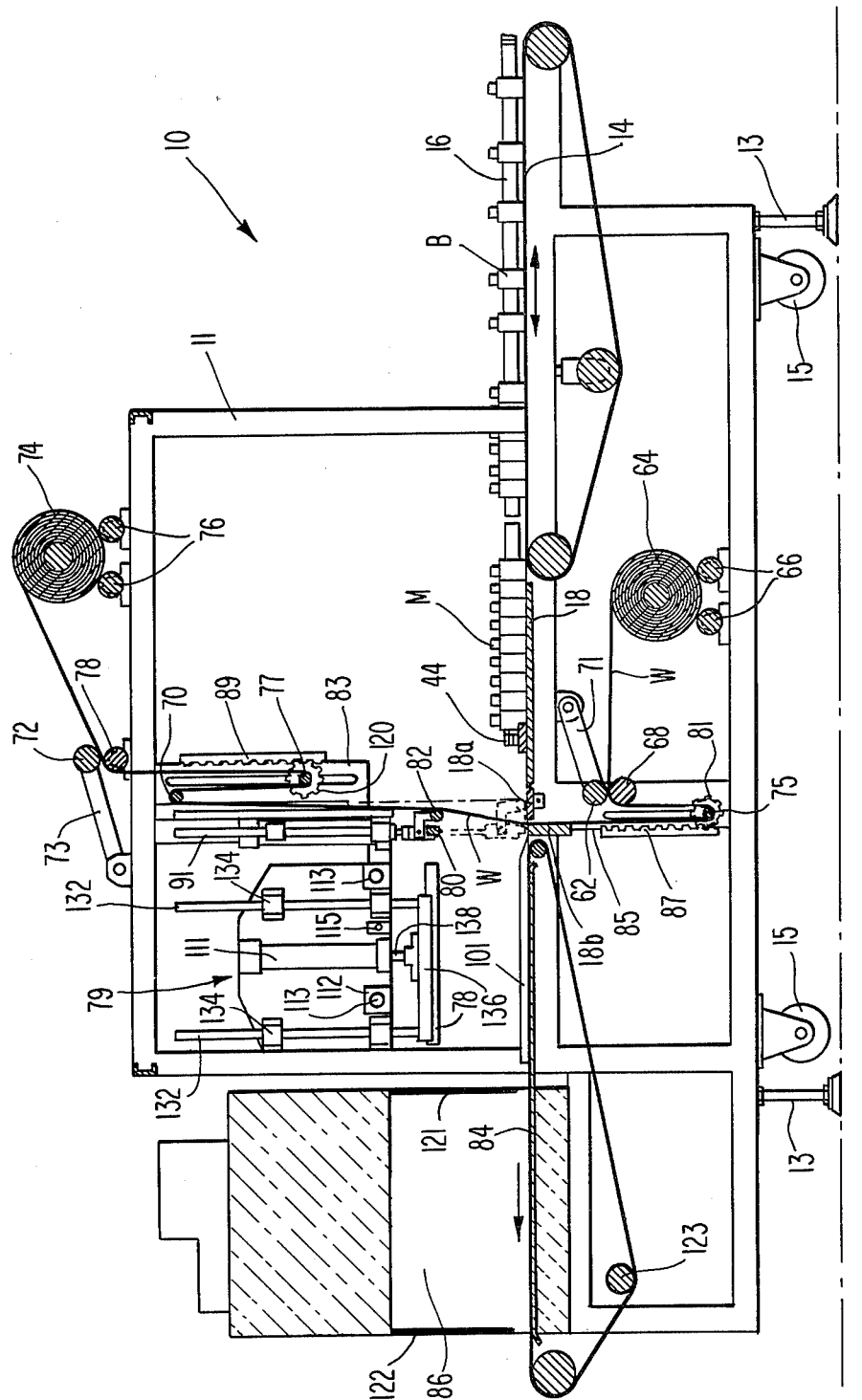
FIG. 2 is a side elevation view of the same apparatus, partially in section, taken along the line 2—2 of FIG. 1.

The vertically draped shrinkable film encountered and wrapped about collated group of articles M during sliding transfer by carriage assembly 20 onto conveyor 84 is continuously fed (as seen in FIG. 2, but not FIG. 1) from a lower film supply roll 64 and an upper film supply roll 74, each engaged by idler rolls 66 and 76 respectively through nip rolls 62 and 72 respectively tensioned into engagement by members 71 and 73 respectively attached to frame 11, the respectively engaged nip rolls 68 and 78 being driven by motorized means not shown. For constant tensioning and alignment of the continuously fed film, it passes next over dancer rolls 75 and 77 respectively, each having gears 120 and 81 respectively and adapted to move freely vertically in support brackets 83 and 85, each carrying racks 87 and 89 engaging gears 120 and 81 at the two sides of each of dancer rolls 75 and 77 thereby to keep them horizontal and to maintain constant tension upon the continuously fed film W.

Film fed from upper supply roll 74 then passes over still another idler roll 70, reversing its direction downwardly and around horizontal guide roll 82, associated with the rear sealing bar 80. Upper fed film W then meets and is spliced with upwardly fed film W from lower supply 64 just above the level of the top of collating position support plate 18 and conveyor 84. In operation, drive rolls 68 and 78 may be driven synchronously with the longitudinal forward movement of carriage assembly 20 so as to provide a positive feed of film W as it is engaged by members 61. Alternatively, and preferably other synchronization means may be provided to supply a positively fed film to the tensioning-alignment dancer rolls as film is required to be delivered therefrom. For example, in the preferred form of the present invention, the positive feed means is activated by a sensor which signals any departure of the dancer roll from its rest position.

While dancer rolls have previously been provided in continuously fed vertically draped shrinkable film wrapping machines, none are known to have included synchronously driven positive feed means to supply film to the dancer rolls and thus to limit the travel required of the dancer rolls in order to maintain film tension. In the absence of such direct, positive film feed, excessive dancer roll movement is required to supply some length of the required film and this may result in the roll reaching its upper or lower travel limit and resultant impairment of its film alignment and tensioning function. Such direct positive feed means would provide a corresponding functional advantage, for the same reason, to alignment-tensioning means other than the dancer rolls disclosed herein.

The film feeding and tensioning alignment means in the present invention are notable also for the fact that they are readily accessible (from both sides of the machine) and relatively simple to set-up and maintain. This simplicity and convenience for film threading and maintenance of the film feeding assembly is enhanced in this design, by a transverse access means, such as a removable base plate section, more specifically hinged plate 18a, extending outwardly from collating position base plate 18 and over which collated groups of articles M are transferred by sliding carriage assembly 20 during transfer of the collated group of articles M onto conveyor 84.

While film W may comprise any sealable and shrinkable film, polyolefins and particularly polyethylene film of a low density variety is most commonly used. In the present invention, wrapping film W preferably comprises a cross-linked polyolefin such as cross-linked polyethylene sold by the W. R. Grace Company under the trade name Cryovac. While such Cryovac film has previously been used in manual collating and shrink wrap processes with impulse heated "L-sealers", prior commercially available automatic shrink wrapping machines have generally been designed to utilize low density polyethylene requiring resistance heating for sealing.

Preferably, the draped cross-lined polyethylene film is $\frac{3}{4}$ to $1\frac{1}{2}$ mils thick.

Figure 5:
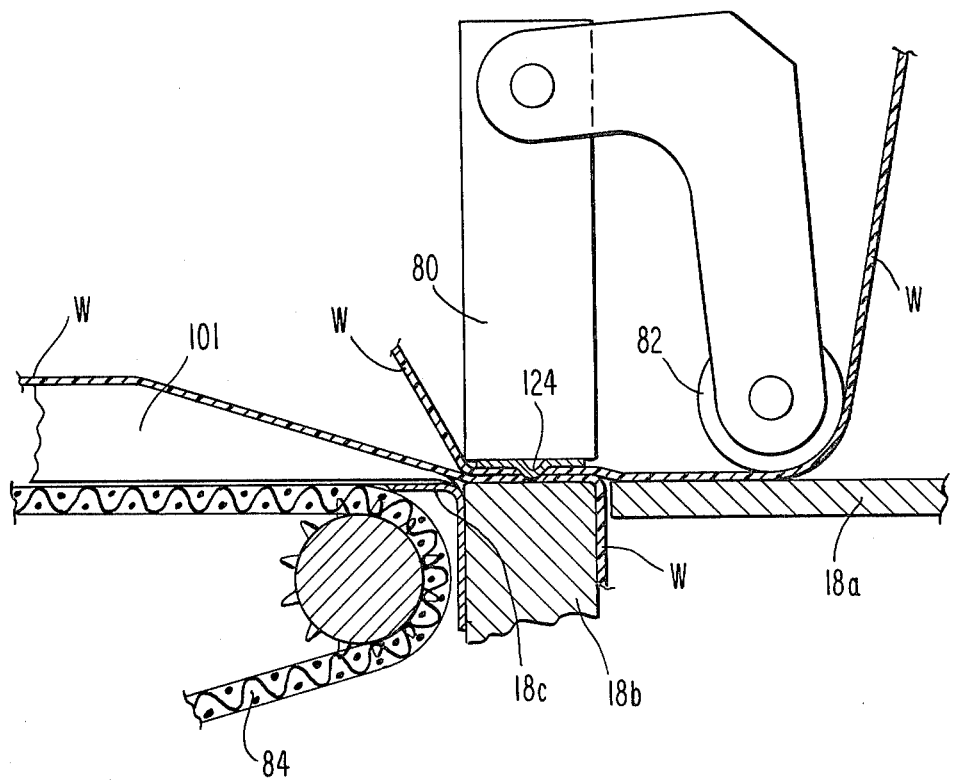
FIG. 5 is an exploded side elevation view of the rear sealing means as shown in FIG 2.

Impulse heated rear sealer 80 and pivotally associated, downwardly biased horizontal film guide roll 82 are guided by vertically reciprocating rod 91 operated by a pneumatic piston (not shown). Guide roll 82 assures final alignment of film M and prevents inadvertent contact heating of film W by rear sealer 80. Upon movement of a collated group of articles M into rear sealing position on conveyor 84 and retraction of carriage assembly 20 to its starting position, rear sealer 80 is lowered, roller 82 first engaging top surface of hingible plate member extension 18a and pivoting slightly in a counterclockwise direction, thus guiding film W from upper supply roll 74 backward and away from rear sealer 80 in the down position (as shown in phantom) to further insure wrinkle-free backward tensioning of film W, to assure final alignment of film feed, to present a flat, horizontal film overlay for sealing and cutting, and to avoid any contact heating of the rearmost portion of film W except at the intended contact point with rear sealer 80 in the down position. Referring to FIG. 5, a center cutting bead 124 extends along the length of the rear sealer 80. During impulse heat sealing of the upper and lower film wrapped about collated article group M at the rear sealing position, bead 124 cuts the film by melting through the upper and lower wraps along the line of contact with bead 124. At the same time, the flat surface of rear sealer 80 on both sides of the bead 124 seals together the upper and lower wraps about the collated articles group M, at the same time splicing the upwardly and downwardly fed film so that upon upward movement and disengagement of rear sealer 80 and its associated mechanism, spliced vertically draped film W remains for engagement of a subsequently presented collated bottle group M.

In a preferred embodiment of the present invention, side sealing bars 78 associated with side sealing mechanism 79 are located at a longitudinal position just offset from the rear sealing position and means are provided for indexing conveyor 84 a limited distance to position collated bottle group M with wrapped film sealed at its rear end just under side sealing assembly 79.

Functioning in conjunction with side sealing bars 78 are laterally adjustable side sealing anvils 101.

Figure 4:
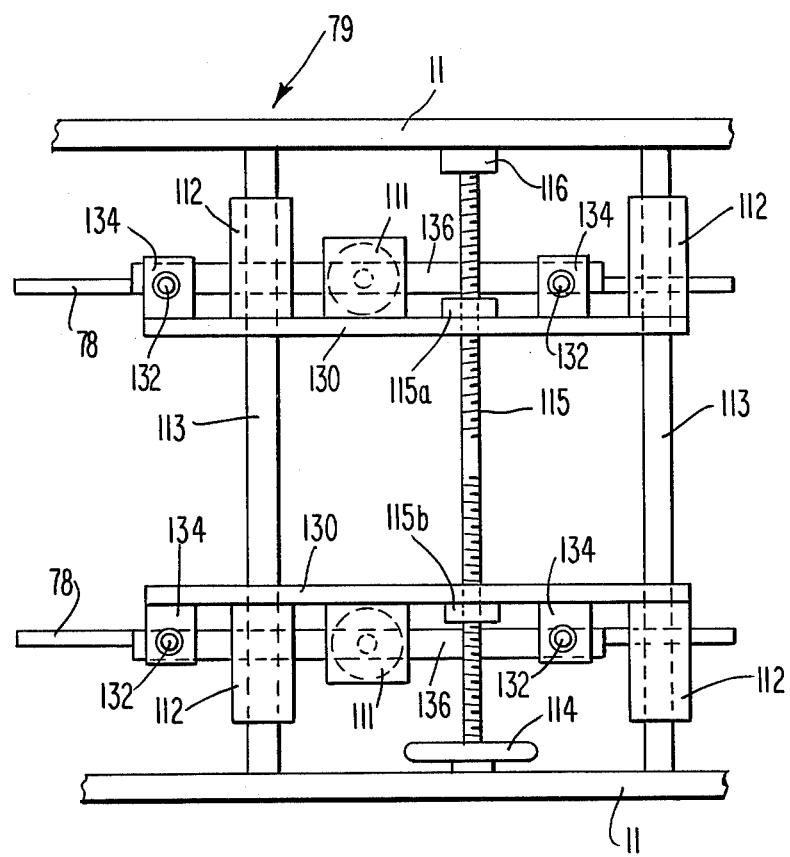
FIG. 4 is an expanded plan view of a part of the apparatus shown in FIGS. 1–3, showing particularly the self-centering and aligning, adjustable side sealing means of the apparatus.

To maintain automatic centering and parallelism of the laterally adjustable side sealing bars 78, side sealing bars 78 are associated with side sealing bar assembly 79, which is better seen in the plan view of FIG. 4. Side sealing bar assembly 79 includes rail guides 113 attached at their ends to the frame 11. The rail guides 113 are substantially parallel to each other and are disposed transversely with respect to the frame 11. A pair of plates 130 and mounting bushings 112 attached thereto, move slidingly along the guide rails 113 and are in orthogonal relationship with rail guides 113. Vertically disposed rods 132 are free to move up and down through bushing brackets 132. Sealing bars 78 are held by sealing bar retainer 136, which is itself attached to the ends of vertical rods 132. Vertically actuable cylinders 111 attached to plates 130 (as better seen in FIG. 2) function to raise and lower the side sealing bars 78, by the vertical movement of piston 138 attached to sealing bar retainer 136. Automatic centering and parallel side sealing bars 78 are maintained in alignment because of the mechanical relationship and cooperation between guide rails 113, plates 130 and vertical rods 132. Lateral adjustment, while maintaining automatically centering and parallelism of side sealing bars 78, is effected by hand operated adjustment wheel 114, just inside of frame 11. Wheel 114 turns shaft 115 having right hand and left hand threads on its two opposite ends in turn engaging threaded supports 115a and 115b on plates 130. When wheel 114 is turned then, it automatically laterally adjusts inwardly or outwardly side sealing bars 78 through the corresponding movement of plates 130, pistons 111, and retainers 136. Shaft 115 is retained by bearing block 116 fastened to frame 11 at the side opposite that at which hand wheel 114 is located.

As previously indicated, side sealing bars 78 are provided with impulse heating means (not shown) which are activated upon lowering of side sealing bars 78, thus to seal the sides of upper and lower wrapped film W about a collated article group M. In doing so side sealing bars 78 clamp the film to be sealed against side sealing anvils 101, which are also laterally adjustable to accomodate module packages of different widths. In FIG. 5 it will be seen that anvils 101 extend rearward to a point just short of the transverse sealing line, and include an inclined plane which extends below the level of the top surface of conveyor 84 and rear sealing anvil 18b and the short platform 18c extending therefrom toward the top surface of conveyor 84. This inclined plane functions as a film guide to assure that the wrapped film at the sides of the package is properly positioned for side sealing and is not inadvertently snagged on or drawn under anvils 101.

For subsequent shrinking of the thus sealed wrapped package, conveyor 84 is then activated to transport wrapped and sealed collated bottle group M through heated shrinking heating tunnel 84, heated by means not shown and enclosed in part by vertically draped tunnel closures 121 and 122. After the sealed and shrunk wrapped package has exited the tunnel at the end thereof, conveyor 84 may be stopped upon release of the interlock and latch mechanism associated with stop member 88.

In this, the preferred embodiment of the present invention, heat shrinking tunnel 86 is mounted on an extension of frame 11 and is an integral part of machine 10. Conveyor 84, comprising a mesh belt driven by a powered pin driving roller 123, transports the collated article group M from the rear sealing position through tunnel 86.

Use of the pin driven mesh conveyor in this apparatus is important in that it permits positive speed and position control, positive alignment of the collated package prior to film shrinking, and uniform heating of the bottom as well as the sides and top of the package in the tunnel 86.

In the operation of the present invention in its preferred embodiment, glass bottles B are transported by a single line conveyor 12 to mass in-feed conveyor 14 of machine 10. Rails 16, like rail guides 38, are adjustable and are typically spaced-apart a distance substantially equal to the distance which the container guides rail 38 are spaced-apart, i.e., the width of the bottle group.

Disposed on carriage guide rails 24 are two spaced-apart adjustable stops for limiting the forward and reverse movement of carriage assembly 20. At first adjustable stop 88 carriage assembly 20 is latched into collating position by conventional means (not shown) such as a spring loaded manually releasable latch mechanism. While the carriage assembly 20 is latched into collating position, bottles are fed onto base 18 and into carriage assembly 20 by in-feed conveyor 14. The bottles are pushed by the massed bottles on conveyor 14 toward stop member 44, which determines the module pattern (with such manual assit as may be necessary). Base 18 together with hinged base extension 18a, extends from conveyor 14 to conveyor 84.

After carriage asembly 20 is filled with bottles between guide rails 38, the mass in-feed conveyor 14 is reversed in its direction so as to separate those bottles in the carriage assembly from bottles on the mass in-feed conveyor 14. This particular point in the module fabrication is shown in FIG. 1.

Once separation has occured, bottles will continue to be fed into mass in-feed conveyor 14 from single line conveyor 12, resulting in continued backing-up of bottles in conveyor 12, and effectively collating them at that point.

After separation has occurred the operator swings the pivotable stop member from the front to the rear of the bottle group so that the second surface 50 of stop member 44, can be mated with the rear of bottle group M. To accomplish this mating of the rear of the bottle group and second surface 50 it may be necessary to remove a few bottles from the carriage assembly 20, for example in those instances when alternating rows are to have one less bottle.

With the pivotable product stop 44 at the rear of the module, the operator releases the latch mechanism of the first adjustable stop 88 and transfers the entire carriage assembly 20 along rails 24, by pushing handle 48 associated therewith. In so doing, leading members 61 are caused to engage the draped wrapping film; in this manner a top and bottom wrap of the film along the length of the collated article group in the carriage is effected.

(A time solenoid interlock associated with the first adjustable stop 88 prevents the operator from moving the carriage assembly 20 until the previous module has cleared the exit end of the shrink wrapped tunnel 86, preventing a module from being stopped inside of the tunnel 86.)

During this movement, it is important that collated bottle group M is not disturbed in its pattern nor are bottles misaligned. This is achieved largely because of the means providing common drive movement to the container guide rails 38 and the fact that the side guide rails 38 move with the collated bottle group during this movement.

The forward-most travel of the carriage assembly 20 is determined by the second adjustable stop 90. Unlike the first adjustable stop 88, no latching mechanism is associated with the second adjustable stop 90, it merely functions as a stop.

When carriage assembly 20 encounters second adjustable stop 90, bottle group M has moved through the draped film wrapping and is wrapped on its front, top and bottom, and is positioned on the conveyor 84 for rear sealing. Subsequently, conveyor 84 is indexed for side sealing then conveyor 84 transfers the sealed package through shrink tunnel 86. During this movement, transfer of carriage assembly 20, along base 18, is automatically prevented by the tunnel interlock associated with stop members 88. Once bottle group M is on conveyor 84, the operator returns carriage assembly 20 back to its bottle receiving and collating position and the pivotable product stop is again swung around the carriage assembly 20 to its forward position.

The operator next pushes dual (for safety) sealing buttons (not shown) to actuate driving means lowering member 81 and transverse rear sealing bar 80 which seals the rear of the wrapped module and cuts and splices the remaining film W. The unused film is then free to return to its original draped position under the influence of dancer rolls 75 and 77. After transverse rear sealing bar 80 has been returned to its upper position, conveyor 84 automatically indexes the bottle group M slightly forwardly for engagement by side sealing members 78 and anvils 101. The operator then again presses the dual sealing buttons, this time actuating side sealing assembly means 79 and side sealing bars 78. After side sealing bars 78 return to their upper position conveyor 84 is again actuated and carries the module through shrink wrap tunnel 86, wherein film W is shrunk tightly around the module. The conveyor 83 continues to operate until the next movement of the carriage assembly which permits the shrink wrapped module to exit tunnel 86.

The extension of conveyor 84 from the sealing area into the shrink wrap tunnel 86 eliminates the transfer problems which occur when a module is sealed in one location and then physically transferred to a separate location for shrinking of the wrapping. Furthermore, no dead plate, which might tend to misalign bottles, is encountered in this transfer.

Thus, the bottle collating and shrink wrap packaging apparatus of the present invention provides a means for forming an article group and shrink wrapping it in a continuous operation utilizing a single machine consisting of several integrated sub-assemblies, some of which are themselves novel. Moreover, it does so while avoiding the problem of disturbing the collated article pattern from the point of collection and collating to the point of a finished package.

In summary, the semi-automatic collating and shrink wrapping apparatus of this invention lends itself to utilization in a relatively small and even "portable" integrated construction which is simple to operate and maintain. Moreover, the apparatus embodying the present invention permits relatively quick and reliable collation of articles and particularly small and "unstable" articles, such as small bottles, and transferring a collated group of such articles while maintaining the stability thereof through rear sealing, side sealing and shrinking positions to produce in an integrated manner a unitized package of collated articles and to do so with a minimum of operational downtime due to article misalignment in the course of handling. Moreover, apparatus of this invention provides for convenient mounting, threading, feeding and automatic tensioning and supply of shrinkable film and minimization of inadvertent film damage, misalignment and wrinkling during transverse sealing, movement of articles through the vertically draped film and return of the film to its draped position after the wrapping operation. Still further, apparatus of this invention is seen to be more easily maintained and repaired than those heretofore available due to its simplicity and minimum number of moving parts. This also renders it relatively inexpensive to manufacture. Finally, apparatus of this invention requires relatively little floor space due to its integrated construction and simplicity and all of this is accomplished in a machine which is easily adjustable to handle a variety of articles or bottles while nevertheless automatically maintaining and controlling or facilitating centering and alignment control of all operational elements to accommodate varying size and shape articles to be collated and wrapped.

While this invention has been described with respect to a specific embodiment, it is not limited thereto. The appended claims therefore are intended to be construed to encompass all forms and embodiments of the invention, within its true spirit and full scope, whether or not such forms and embodiments are suggested herein.

We claim:

1. Apparatus for collating articles into a module and shrink wrapping in the course of longitudinal movement thereof, said apparatus comprising:
    means for mass feeding articles into an article module forming means, said feeding means adapted to interrupt the mass feeding of articles and to remove articles rearwardly of a predetermined module cut-off point;
    means for draping under tension a module wrapping film forwardly of said forming means in precise alignment with said module forming means in the direction of travel thereof;
    said forming means adapted for slideably transferring a module formed in said forming means forwardly to a wrapping position, said forming means having three-sided contact with said formed module for providing stability to said articles in the course of transferring said module to a wrapping position in the course of said transfer, said draped film being wrapped from the front to the rear of said module along the top and bottom thereof, said module forming means comprises two laterally adjustable side rail members for determining the sides of said module, said side rail members being attached to a carriage means disposed to the side and below said module forming means, said carriage means adapted to effect said sliding transfer of said module, said module forming means further including
    (a) an article stop means at the forward end thereof, said stop means adapted to be removed from its article stopping position during said sliding transfer movement, so as to avoid interference therewith, and (b) an article pushing means at the rear end thereof, said article pushing means adapted to be removed from its article pushing position during activation of said means for mass feeding articles into said article module forming means so as to avoid interference therewith;

means at said wrapping position for rear and side sealing of said collated article module;

means for shrinking said wrapping film over said collated module; and conveyor means for transferring said module from said wrapping position through said means for shrinking said wrapping film.

2. Apparatus as recited in claim 1, wherein said article module forming means further includes:

first and second film pushing members each attached by a connecting member to said first and second side brackets respectively, said film pushing members positioned forward of said stop member and adapted in the course of transfer of a module in said article module forming means to contact said draped film so that it wraps evenly and wrinkle-free about the module.

3. Apparatus in accordance with claim 1 wherein said article stop and article pusher means comprises a pivotable article stop and pusher mechanism having a stop-pusher member attached to a pair of spaced apart swing arms being pivotably mounted to said forming means, said pivotable product-pusher member constructed to swing on said swing arms over the formed module and contact articles at the rear thereof.

4. Apparatus, as recited in claims 1, or 3, wherein all of said means are disposed on a common frame.

5. Apparatus in accordance with claims 1, or 3, further including carriage means adapted to provide coordinated longitudinal movement of said module forming means said carriage means comprising:

first and second shafts mounted to said frame and substantially parallel to each other;

sprockets at the two ends of each of said first and second shafts to coordinate the movement thereof;

a pair of sprocket drive chains, each mechanically linked at its end to a member associated with one side of said module forming means and adapted to mate with one of said shaft sprockets on each of said shafts thereby to provide common movement of said module forming means in the course of module transfer.

6. An apparatus for collating articles into a module and adapted to accommodate a wide range of patterns and pattern sizes and article shapes and sizes comprising:

reversible means for mass feeding articles into an article module forming means, said reversible means adapted, by reverse actuation thereof, to interrupt mass feeding and to remove from said article module forming means articles resting rearwardly of a predetermined module cut-off point; and said article module forming means adapted to receive said articles and to form a module thereof, including a pair of laterally adjustable article side rails for determining the width of said article module, said article module forming means and side rails adapted to slidingly transfer said module collated therein into engagement with a vertically draped shrinkable wrapping film, said module forming means comprises two laterally adjustable side rail members for determining the side of said module, said side rail members being attached to a carriage means disposed to the side and below said module forming means, said carriage means adapted to effect said sliding transfer of said module, said module forming means further including (a) an article stop means at the forward end thereof, said stop means adapted to be removed from its article stopping position during said sliding transfer movement, so as to avoid interference therewith, and (b) an article pushing means at the rear end thereof, said article pushing means adapted to be removed from its article pushing position during activation of said means for mass feeding articles into said article module forming means so as to avoid interference therewith.

7. Apparatus for collating articles into a module and adapted to accommodate a wide range of patterns and pattern sizes and article shapes and sizes and for shrink wrapping the module, comprising:

reversible means for mass feeding articles into a article module forming means, said means adapted, by reverse actuation thereof, to interrupt mass feeding and to remove from said article module forming means articles resting rearwardly of a predetermined module cut-off point;

said article module forming means including a pair of laterally adjustable article side rails for determining the width of said article module;

tensioning and alignment means for draping under tension a nodule wrapping film forwardly of said carriage assembly while maintaining said film in alignment with said assembly constructed for traveling in the direction of said draped film;

means for slidingly transferring said article module forming means and article module forwardly to a wrapping position, in the course of said transfer, said draped film being wrapped from the front to the rear of said module along the top and bottom thereof, said module forming means comprises two laterally adjustable side rail members for determining the sides of said module, said side rail members being attached to a carriage means disposed to the side and below said module forming means, said carriage means adapted to effect said sliding transfer of said module, said module forming means further including (a) an article stop means at the forward end thereof, said stop means adapted to be removed from its article stopping position during said sliding transfer movement, so as to avoid interference therewith, and (b) an article pushing means at the rear end thereof, said article pushing means adapted to be removed from its article pushing positon during activation of said means for mass feeding articles into said article module forming means so as to avoid interference therewith;

means at said wrapping position for transverse rear sealing;

means for side sealing said article module;

means for shrinking said wrapping film over said container module; and ferred collated article group has cleared said shrinking means and to resist forward movement otherwise.

22. Apparatus, in accordance with claims 1 or 11 or 17, wherein said article module forming means transfers an article module formed therein to a transverse sealing means position, at which said transverse sealing means is actuated, which transverse sealing means position is displaced slightly from a side sealing means position at which said wrapped film is sealed along the sides thereof by activation of a side sealing means, and a single conveyor means is adapted for intermittent movement to transfer a wrapped collated article module located thereon from said rear sealing position to said side sealing position and thereafter in a single continuous movement from said side sealing position through said film shrinking means.

23. Apparatus, as recited in claim 18, wherein each of said side sealing anvils include, at its rearward end, an inclined plane sloping downward to a level at or below the top surface at which a wrapped article module is supported in said wrapping position, said sealing anvils with inclined planes adapted to guide film upwardly and over said anvils.

24. Apparatus for collating articles into a module and shrink wrapping in the course of longitudinal movement thereof, said apparatus comprising:
 means for mass feeding articles into an article module forming means, said feeding means adapted to interrupt the mass feeding of article and to remove articles rearwardly of a predetermined module cut-off point;
 means for draping under tension a module wrapping film forwardly of said forming means in precise alignment with said module forming means in the direction of travel thereof;
 said forming means adapted for slideably transferring a module formed in said forming means forwardly to a wrapping position, said forming means having three-sided contact with said formed module for providing stability to said articles in the course of transferring said module to a wrapping position in the course of said transfer, said draped film being wrapped from the front to the rear of said module along the top and bottom thereof,
 means at said wrapping position for rear and side sealing of said collated article module;
 means for shrinking said wrapping film over said collated module; and
 conveyor means for transferring said module from said wrapping position through said means for shrinking said wrapping film, wherein said module forming means comprises two laterally adjustable side rail members for determining the sides of said module and a pivotable product stop having a stop member attached to a pair of spaced apart swing arms being pivotally mounted to said forming means, said pivotable product stop constructed to swing over the formed module and contact articles at the rear thereof.

25. In an apparatus for shrink wrapping successively presented collated groups of articles by interposing a vertically draped sheet of top and bottom fed spliced shrinkable wrapping film in a path of travel of said collated groups of articles, the improvement consisting of
 a top supply roll, mounted above said carriage assembly, and transfer means, from which film is fed through tensioned nip and positive feed drive rolls directly to top tensioning and alignment means and thence downwardly;
 a bottom supply roll, mounted below said carriage assembly and transfer means from which film is fed through tensioned nip and positive feed drive rolls directly to a second bottom tensioning and alignment means and thence upwardly;
 said films fed respectively from said top and bottom supply rolls meeting with one another and being spliced to form together an essentially continuous film, including synchronization means for positively feeding said film to said tensioning means as it is required to be delivered therefrom;
 further including transverse rear sealing means comprising a vertically reciprocal, transverse rear sealing bar having a bead extending along the length thereof, said bead adapted to melt through the top and bottom wrapping film upon contact therewith while sealing the top cut ends to the bottom cut ends, said means further including sealing means guide means adapted to prevent inadvertent contact of said film with said sealing means prior to movement thereof to its sealing position and also adapted to present said film in a flat, horizontal disposition to said sealing means when it is in its sealing position, said guide means comprising a pivotally attached, downwardly biased guide roll for engaging said vertically draped film rearward and just below the level of said sealing bar.

26. Apparatus in accordance with clim 25, wherein said tensioning and alignment means comprise:
 top and bottom dancer rolls for engagement with top and bottom fed wrapping film;
 gear means attached to said top and bottom dancer rolls;
 support brackets each having racks constructed to engage said gear means for providing vertical movement of said dancer rolls, thereby providing tension to and alignment of wrapping film positively fed synchronously with the operation of said respective dancer rolls.

27. Apparatus as recited in any of claim 16, 17, 19, 25 or 26, including a base plate, over which said successively presented groups of articles pass as they engage said vertically draped shrinkable wrapping film, said base plate including a movable section adapted to facilitate access to said bottom film tensioning and alignment means.

28. Apparatus for side sealing top and bottom wrapped article modules comprising:
 a frame;
 a pair of guide rails substantially parallel to each other and attached at their ends to said frame;
 a pair of plates, vertically disposed and slideable along said guide rails and in orthongonal relationship thereto;
 a pair of laterally adjustable sealing bars, adapted for sealing together top and bottom wrapping upon clamping thereof between said bars and laterally adjustable side sealing anvils disposed below said bars, said sealing bars being axially parallel with said plates;
 means for vertically operating said sealing bars;
 vertically disposed rods for guiding said sealing bars in vertical travel, said rods being guided in their vertical travel by said plates;

said vertical rods and said guide rails providing for parallelism and self-centering of said sealing bars said apparatus further including:

a shaft having right and left handed threads thereon, being attached to said frame and substantially parallel to said guide rails, said threaded shaft constructed for simultaneous and opposite lateral movement of said plates and said sealing bars by rotation thereof.

29. Apparatus in accordance with claim 28, wherein said sealing bar vertical operation means and said vertical rods are mechanically linked to said sealing bar by a bar retention means.

30. Apparatus in accordance with claim 28, wherein said shaft is rotated by an adjustment wheel attached thereto.

* * * * *

UNITED STATES PATENT AND TRADEMARK OFFICE
CERTIFICATE OF CORRECTION

PATENT NO. : 4,214,419
DATED : July 29, 1980
INVENTOR(S) : Fred E. Allen et al

It is certified that error appears in the above-identified patent and that said Letters Patent are hereby corrected as shown below:

Col. 2, line 7, delete "manufactured by Hirsch of Germany".

Col. 2, lines 8 and 9, delete "from Italy".

Col. 3, line 35, delete "continuously fed".

Col. 7, line 21, delete "continuously".

Col. 7, lines 29, 37, and 57, in each instance, delete "continuously fed".

Signed and Sealed this

Tenth Day of February 1981

[SEAL]

Attest:

Attesting Officer

RENE D. TEGTMEYER

Acting Commissioner of Patents and Trademarks